(12) United States Patent
Hackenberg

(10) Patent No.: US 6,421,591 B1
(45) Date of Patent: Jul. 16, 2002

(54) METHOD AND ARRANGEMENT FOR CONTROLLING ACTIVATION OF RESTRAINING DEVICES IN A MOTOR VEHICLE

(75) Inventor: Ulrich Hackenberg, Wettstetten (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/521,816

(22) Filed: Mar. 9, 2000

(30) Foreign Application Priority Data

Mar. 10, 1999 (DE) .......................................... 199 10 596

(51) Int. Cl.⁷ ............................ B60R 22/00; G06F 7/00
(52) U.S. Cl. .............................. 701/45; 701/36; 701/46; 180/268; 180/271; 180/282; 280/734; 280/735; 307/10.1
(58) Field of Search ............................. 701/36, 41, 45, 701/46, 47; 280/734, 735; 180/282, 268, 271

(56) References Cited

U.S. PATENT DOCUMENTS

| | | | | |
|---|---|---|---|---|
| 5,261,506 A | * | 11/1993 | Jost | 180/282 |
| 5,372,411 A | | 12/1994 | Gerstenmaier et al. | 303/100 |
| 5,449,198 A | * | 9/1995 | Jeenicke et al. | 280/735 |
| 5,468,013 A | * | 11/1995 | Gille | 280/735 |
| 5,483,447 A | * | 1/1996 | Jeenicke et al. | 701/45 |
| 5,510,989 A | | 4/1996 | Zabler et al. | 701/45 |
| 5,513,109 A | * | 4/1996 | Fujishima | 701/45 |
| 5,605,202 A | | 2/1997 | Dixon | 180/268 |
| 5,737,224 A | * | 4/1998 | Jeenicke et al. | 701/45 |
| 5,762,366 A | * | 6/1998 | Faye | 280/735 |
| 5,890,084 A | * | 3/1999 | Halasz et al. | 701/45 |
| 5,983,148 A | | 11/1999 | Bigi et al. | 701/45 |
| 5,996,409 A | * | 12/1999 | Funk et al. | 73/504.04 |
| 6,113,138 A | * | 9/2000 | Hermann et al. | 280/735 |
| 6,198,997 B1 | * | 3/2001 | Ishikawa et al. | 701/45 |
| 6,256,565 B1 | * | 7/2001 | Yanagi et al. | 701/45 |

FOREIGN PATENT DOCUMENTS

| | | |
|---|---|---|
| DE | 4334671 | 4/1995 |
| DE | 4436162 | 3/1996 |
| DE | 19520608 | 12/1996 |
| DE | 19632836 | 11/1997 |
| DE | 19736840 | 2/1999 |
| EP | 0649776 | 4/1995 |
| EP | 0649777 | 4/1995 |

* cited by examiner

Primary Examiner—Jacques Louis-Jacques
(74) Attorney, Agent, or Firm—Baker Botts LLP

(57) ABSTRACT

A method and an arrangement are described for controlling activation of occupant restraining devices in a motor vehicle in which actual data relating to vehicle motion are detected and applied to an activation algorithm to generate activation signals as required for the activation of at least one of the restraining devices. In the disclosed method the following steps are performed: detecting actual data relating to vehicle motion; determining a target condition of vehicle motion corresponding to the desired operating behavior of the vehicle; comparing an actual condition of vehicle motion determined from at least some of the actual data detected with the corresponding target condition; parametering an activation algorithm employed to generate activation signals, taking account of differences between an actual condition and a target condition of vehicle motion; and applying the activation algorithm to at least some of the detected actual data for generation, as required, of situation-adapted activation signals for activation of at least one of the occupant restraining devices.

7 Claims, 2 Drawing Sheets

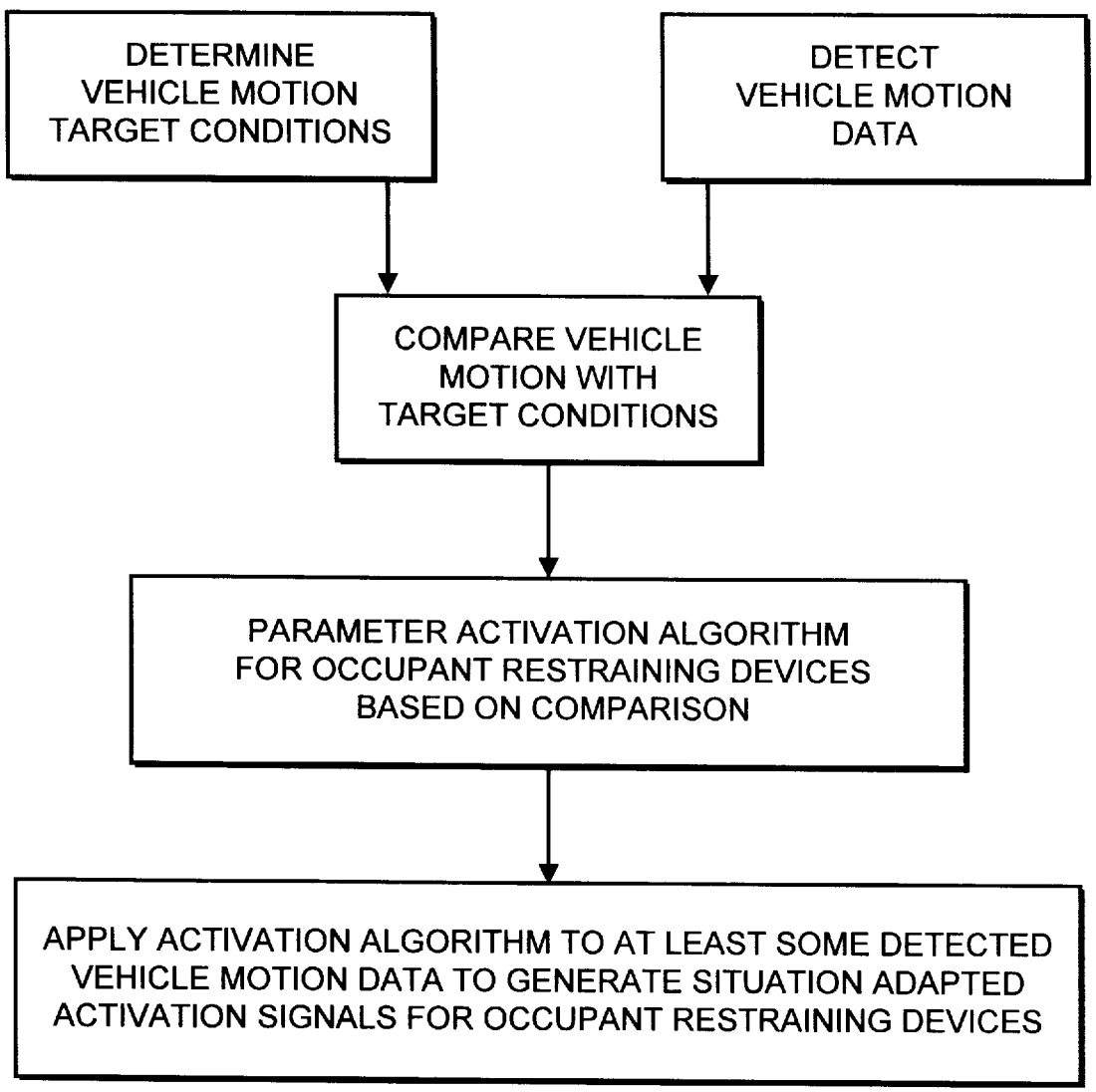
F I G. 2

METHOD AND ARRANGEMENT FOR CONTROLLING ACTIVATION OF RESTRAINING DEVICES IN A MOTOR VEHICLE

BACKGROUND OF THE INVENTION

This invention relates to methods for controlling activation of occupant-restraining devices in a motor vehicle, in which data relating to vehicle motion is detected and used in an activation algorithm to generate activation signals as required for activation of at least one of the restraining devices. The invention relates also to an arrangement for controlling activation of occupant-restraining devices in a motor vehicle which includes sensors to detect data relating to vehicle motion and a restraining device control unit capable of generating activation signals as a function of the data detected and transmitting the activation signals to the restraining devices for activation thereof.

Such methods and arrangements generally are known in practice and have been disclosed in many documents.

For example, German Patent No. 196 32 836 describes an arrangement for activation of restraining devices in a motor vehicle in which the activation signals for one or more selected restraining devices are generated as a function of data detected by a plurality of sensors. First, use is made of acceleration sensors that permit detection of the acceleration of the vehicle in longitudinal and transverse directions. Second, at least one rotary motion sensor is used to detect vehicle rotation about a vertical axis. From the output of the rotary motion sensor, in addition to data relating to motion in longitudinal and transverse directions, skidding motions may be recognized which, for occupant protection, should cause at least some of the restraining devices to be activated, but which are not detected by the acceleration sensors.

In German Patent No. 196 32 836 an arrangement is described in which individual triggering of the restraining devices, such as seat belts or air bags, appears to be effected, in accordance with the direction and violence of an impact. In the arrangements described in German Offenlegungsschrift No. 195 20 608 and U.S. Pat. No. 5,983,148, which likewise relate to the activation of restraining devices as a function of detected data regarding vehicle motion, several restraining devices are activated in stages, to provide a yet more selective protection. According to Offenlegungsschrift No. 195 20 608, the several stages are triggered when selected limits are exceeded by the detected longitudinal and transverse acceleration values. In the arrangement described in U.S. Pat. No. 5,983,148, the triggering takes place as a function of the violence of a collision, which is determined from differences of detected velocities and the times at which preselected limits of velocities are exceeded.

A common feature of the conventional arrangements is that they disregard the relative stability of the current vehicle condition, although protection of vehicle occupants by restraining devices is required to a greater extent in dynamically critical situations than in less critical situations.

SUMMARY OF THE INVENTION

Accordingly, it is an object of the present invention to provide a method and arrangement for controlling activation of restraining devices in a motor vehicle which overcomes disadvantages of the prior art.

Another object of the invention is to provide a method and an arrangement for controlling activation of occupant-restraining devices in a motor vehicle that will furnish improved protection of vehicle occupants.

These and other objects of the invention are attained by providing a method for controlling activation of occupant-restraining devices in a motor vehicle which includes the following steps:

detecting current vehicle motion data, in particular transverse acceleration, longitudinal acceleration, and rate of rotation about a vertical axis of the vehicle;

determining a target condition of current vehicle motion corresponding to the motion desired behavior of the motor vehicle which is within the scope of an electronic control for vehicle operating dynamics;

comparing an actual condition of vehicle motion, determined from at least a part of the detected current vehicle motion data, with the target condition of vehicle motion, particularly within the scope of an electronic control of operating dynamics;

supplying parameters for a restraining device activation algorithm used to generate activation signals based upon difference between the actual condition and the target condition of vehicle motion; and applying the activation algorithm to at least a portion of the detected actual data in order to generate situation-adapted activation signals for activation as required for at least one of the restraining devices.

In accordance with another aspect of the invention, an arrangement to control activation of occupant-restraining devices in a motor vehicle includes sensors to detect actual data relating to vehicle motion, in particular transverse acceleration, longitudinal acceleration, and rate of rotation about a vertical axis of the vehicle, as well as a restraining device control unit capable of generating restraining device activation signals as a function of the actual data detected and supplying the activation signals to the restraining devices, and a device to determine the target condition of vehicle motion corresponding to the desired behavior of the motor vehicle, and wherein the restraining device control unit is capable of taking account of the target condition of vehicle motion in addition to the current data detected in generating the activation signals.

A particular advantage of the method and arrangement according to the invention is that the determination of the target condition of vehicle motion provides information permitting the generation of activation signals to be adapted to the situation in terms of the operating dynamics of the vehicle at a given time. Thus, by a suitable adjustment of parameters, the restraining device activation algorithm can be set to be more sensitive in dynamically critical situations than in dynamically less critical situations. In other words, for critical situations, a more rapid response behavior of the restraining device activation can be achieved without at the same time risking a premature or excessive activation. The decision algorithm for activation of the restraining devices can thus be rendered substantially more secure.

If a vehicle is provided with an integrated system for electronic control of operating dynamics of the vehicle to support the vehicle operator in situations involving critical operating behavior of the vehicle, then the method and apparatus according to the invention are useful in an especially advantageous embodiment incorporating the sensors and evaluating algorithms of the integrated system. The restraining device control unit can then be provided, without substantial additional cost, with the data already evaluated by the system to control operating dynamics concerning the difference between actual and target conditions of operating behavior, so that they may be incorporated in the parametering of the restraining device activation algorithm.

Furthermore, for additional optimization of the activation of the restraining devices, data concerning the distance of the vehicle from surrounding objects, such as for example other vehicles, can be included in generating the activation signals, especially in the parametering of the activation algorithm. Here again, recourse is advantageously had to the control unit, if present, for automatic distance regulation and its associated sensor system.

Likewise other control units integrated in the vehicle which determine differences between desired and actual conditions of the vehicle may be utilized, aside from their normal function, to deliver additional information to the restraining device control unit, which may then be taken into account for optimal parametering of the activation algorithms.

In another preferred embodiment of the arrangement and method according to the invention, at least some of the restraining devices are activable in at least two stages. Depending on the actual data detected and the determined target condition of operating behavior, or other data made available to the restraining device control unit, the activation of the several stages of several restraining devices may be performed in a differentiated manner. For example, an air bag may be activated more forcefully in dynamically critical situations than in dynamically less critical situations with the same detected actual data of vehicle motion, such as longitudinal or transverse accelerations. In this way, occupant protection especially well tailored to the current situation, and hence especially effective protection, is made possible.

BRIEF DESCRIPTION OF THE DRAWING

Further objects and advantages of the invention will be apparent from a reading of the following description in conjunction with the accompanying drawings in which;

FIG. 2 is a flow chart illustrating the steps of the method of the invention.

DESCRIPTION OF PREFERRED EMBODIMENTS

Figure 1:
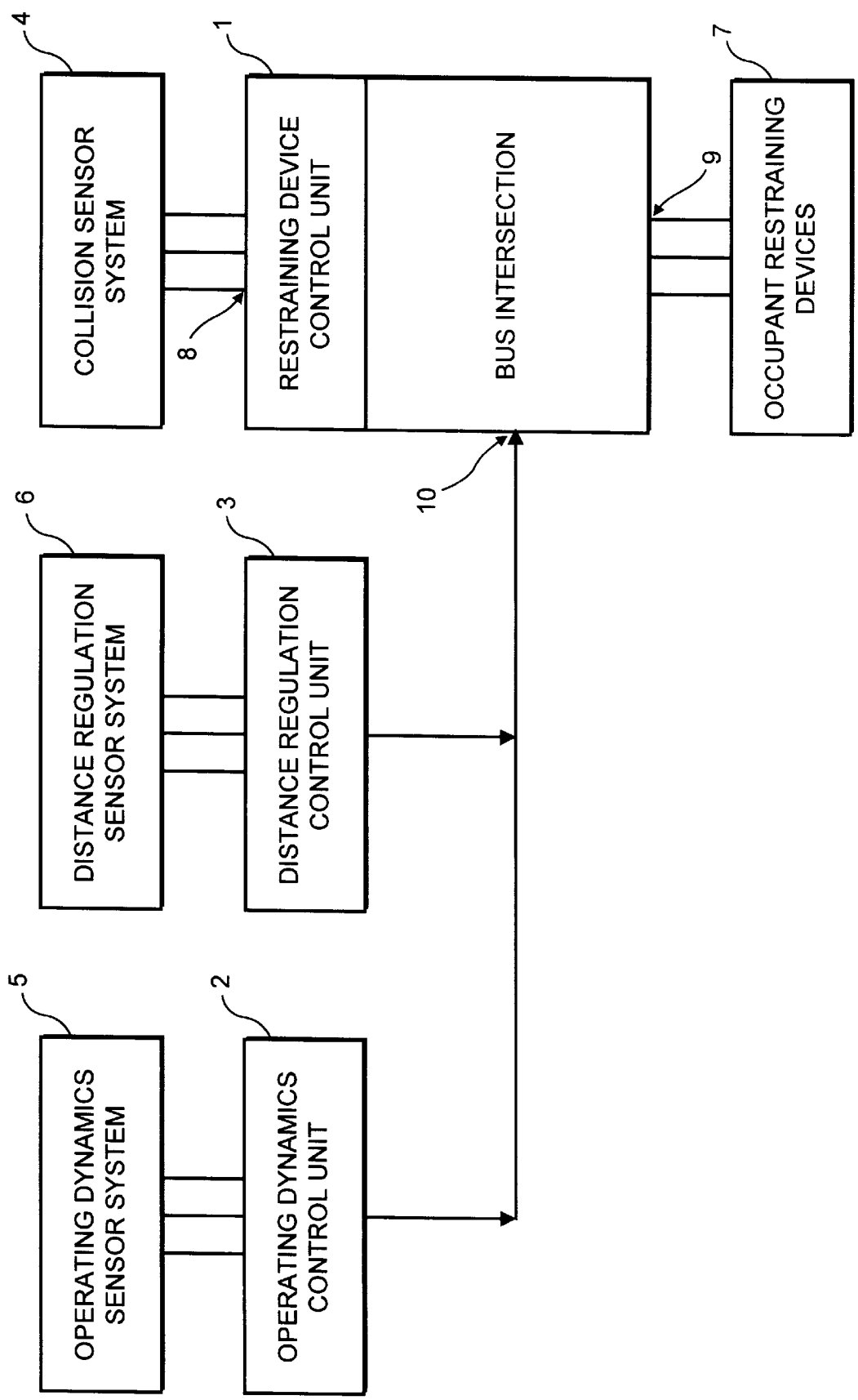
FIG. 1 is a block diagram schematically illustrating a representative embodiment of an arrangement for activating occupant restraining devices in a motor vehicle figure in accordance with the invention.

In the typical embodiment of the invention shown in the drawings, an arrangement for controlling activation of restraining devices includes a restraining device control unit 1, a control unit 2 for electronic control of operating dynamics of the vehicle and a control unit 3 for automatic distance regulation.

The restraining device control unit 1 includes a microprocessor and is connected by a plurality of inputs 8 to corresponding outputs of a collision sensor system 4. The restraining device control unit 1 supplies activating signal outputs 9 from a plurality of triggerable occupant restraining devices 7 in the vehicle, at least some of which are air bags triggerable in a multistage fashion.

The restraining device control unit 1 is connected through additional inputs, or by a bus intersection 10, to an output from the control unit 2 for electronic control of operating dynamics and to an output from the control unit 3 for automatic distance regulation. The control unit 2 for electronic operating dynamics control communicates in turn with a sensor system 5 for detecting vehicle operating dynamics, and the control unit 3 for automatic distance regulation communicates with a sensor system 6 specially provided for distance regulation.

The restraining device control unit 1 and its connection with the collision sensor system 4 and with the restraining devices 7 correspond generally to conventional restraining device control units known in the prior art.

From the collision sensor system 4, the restraining device control unit 1 receives actual data developed by an activation algorithm stored in a microprocessor in the restraining device control unit 1. Whenever any restraining device activation criteria are satisfied in the operation of the activation algorithm and a particular collision situation is recognized, the activation signals associated therewith are transmitted from the restraining device control unit to the restraining devices 7. For example, depending on the transmitted activation signals, only specific individual restraining devices 7 may be activated, or various devices may be activated successively; likewise individual multistage restraining devices may be activated only at a certain stage or only in several stages successively.

An important difference from the conventional restraining device control arrangements is the additional connection of the restraining device control unit 1 to the control unit 2 for electronic regulation of operating dynamics and to the control unit 3 for automatic distance regulation.

Conventional systems for electronic regulation of vehicle operating dynamics are used in order to avert possible skidding of the vehicle by appropriate brake intervention and engine "management."

For that purpose, the vehicle operating dynamics sensors 5 detect, first, actual data regarding vehicle motion, and second, data providing information relating to the desired operating behavior of the vehicle. In the control unit 2 for electronic control of operating dynamics, the actual and target conditions of the vehicle are determined and then the resulting conditions are compared with each other.

Typical data for determining a target condition include the rotational speeds of the vehicle wheels, which may appropriately be provided by associated rotational speed sensors, and the position of the steering wheel, which may be provided by a steering wheel angle sensor. A transverse acceleration sensor detecting any lateral slipping of the vehicle and a rotational speed sensor indicating any skidding tendency furnish actual data for determining actual dynamic conditions of the vehicle. Additionally, longitudinal forces acting on the vehicle can be measured directly by way of a longitudinal acceleration sensor or indirectly by calculation from measured data of a brake pressure sensor and included in the calculation of the actual dynamic vehicle conditions.

If the calculated current and target conditions deviate from each other, then, in accordance with the normal function of the electronic control of vehicle dynamics, appropriate intervention is calculated and executed to stabilize the vehicle operating condition.

According to the invention, the control unit 2 for electronic control of vehicle dynamics, in addition to its normal function, delivers data to the restraining device control unit 1 concerning differences between target and actual conditions of vehicle motion and hence provides advance information for optimal criteria for air bag activation. The parameters of the activation algorithm are then adjusted in the restraining device control unit 1, taking account of the information in the control unit 2 for electronic regulation of vehicle operating dynamics.

The evaluation of the actual vehicle motion data delivered by the collision sensor system 4 is thus performed by a continually updated algorithm so that the process of recognizing an accident situation, and above all its implications in terms of the current vehicle operating conditions, takes place in the light of the current operating conditions, and corresponding activation signals are transmitted to the restraining devices 7.

The activation of the restraining devices 7 is thus carried out more appropriately and securely than is possible with conventional methods or apparatus for the activation of restraining devices. This may manifest itself first in the sensitivity of activation, and second, in dynamically critical situations, an air bag, for example, may be activated more forcefully than in dynamically less critical situations.

The control unit 3 for automatic distance regulation, like the control unit 2 for electronic control of operating dynamics, serves primarily to support the operator in the operation of the vehicle, in this instance in terms of the distance of the vehicle from surrounding objects. For this purpose, again an actual and a target condition are determined and compared with each other.

But the control unit 3 for automatic distance regulation, in addition to its normal function, may deliver data concerning the current operating condition and hence provide advance information for setting the parameters of the activation algorithm for the restraining devices such as air bags. The evaluation of the current data for generation of activation signals can therefore be refined still further, with a resulting further reinforcement of the advantages described above with respect to the data supplied by the control unit 2 for electronic regulation of operating dynamics.

It will be understood that the agreement of measurements detected by the collision sensor system and measurements detected by the operating dynamics sensor system requires only that these quantities be detected within the scope of sensor systems for normal use of those system and that the necessity for additional sensors can thus be avoided.

Although the invention has been described herein with reference to specific embodiments, many modifications and variations therein will readily occur to those skilled in the art. Accordingly, all such variations and modifications are included within the intended scope of the invention.

I claim:

1. A method for controlling activation of occupant restraining devices in a motor vehicle comprising the following steps:
    detecting actual data relating to motion of a vehicle including at least one of transverse acceleration, longitudinal acceleration and rate of rotation about a vertical axis;
    determining a target condition of vehicle motion corresponding to desired operating behavior of the vehicle within the scope of an electronic control for vehicle operating dynamics;
    comparing an actual condition of vehicle motion determined from at least some of the detected actual data with the target condition of vehicle motion;
    parametering an activation algorithm used to generate activation signals for occupant restraining devices based on differences between an actual condition and a target condition of vehicle motion; and
    applying the activation algorithm to at least some of the detected actual data to generate situation-adapted activation signals for activation of at least one of the occupant restraining devices.

2. A method for controlling activation of occupant restraining devices according to claim 1 wherein, as actual data for determining the actual condition of vehicle motion, at least the transverse acceleration, the longitudinal acceleration, and the rate of rotation about the vertical axis of the vehicle are detected and, for determining the target condition, at least the steering angle and the rotational speeds of the vehicle wheels are detected.

3. A method for controlling activation of occupant restraining devices according to claim 1 including taking into account signals produced by a distance regulation system in parametering the activation algorithm.

4. A method for controlling activation of occupant restraining devices according to claim 1 wherein the activation of occupant restraining devices is more sensitively programmed in parametering the activation algorithm in a critical situation as indicated by an ascertained difference between actual and target conditions of vehicle motion.

5. A method for controlling activation of occupant restraining devices according to claim 1 wherein at least some of the occupant restraining devices may be activated in stages according to activation signals generated by the activation algorithm.

6. A method for controlling activation of occupant restraining devices according to claim 5 wherein, up on detection of a skidding of the vehicle, an electronic control for vehicle operating dynamics parameters the activating algorithm in such a way that an air bag employed as restraining device is released with greater force than for like detected actual data of vehicle motion in the absence of a detected skidding of the vehicle.

7. An arrangement for controlling activation of occupant restraining devices in a motor vehicle, comprising:
    a plurality of sensors for detecting actual data of vehicle motion including at least one of transverse acceleration, longitudinal acceleration, and rate of rotation about a vertical axis;
    a restraining device control unit for generating activation signals to activate the occupant restraining devices as a function of the detected actual data and transmitting them to the occupant restraining devices;
    sensors for distance determination; and
    means for determining a target condition of vehicle motion corresponding to desired operating behavior of the motor vehicle;
    wherein the restraining device control unit is capable of taking account of the target condition of vehicle motion in addition to the detected actual data in generating the activation signal and sensors for distance determination and of actual distance data determined from the data detected by the distance determination sensors in addition to the actual data detected and the actual target conditions of vehicle motion in generating the activation signals; and
    a distance control unit for evaluating the data detected by the sensors for distance determination and providing an output for transmitting the actual distance data to an input of the restraining device control unit.

* * * * *